(12) United States Patent
Walzman

(10) Patent No.: US 11,751,901 B2
(45) Date of Patent: *Sep. 12, 2023

(54) COATED ENDOVASCULAR INTRASACCULAR OCCLUSION DEVICE

(71) Applicant: Daniel E. Walzman, Bergenfield, NJ (US)

(72) Inventor: Daniel E. Walzman, Bergenfield, NJ (US)

(*) Notice: Subject to any disclaimer, the term of this patent is extended or adjusted under 35 U.S.C. 154(b) by 497 days.

This patent is subject to a terminal disclaimer.

(21) Appl. No.: 16/882,410

(22) Filed: May 22, 2020

(65) Prior Publication Data

US 2021/0022765 A1 Jan. 28, 2021

Related U.S. Application Data

(63) Continuation-in-part of application No. 15/732,365, filed on Oct. 30, 2017, now Pat. No. 10,448,970.

(Continued)

(51) Int. Cl.
*A61B 17/12* (2006.01)
*A61B 17/3207* (2006.01)
(Continued)

(52) U.S. Cl.
CPC .. *A61B 17/320758* (2013.01); *A61B 17/1214* (2013.01); *A61B 17/1219* (2013.01);
(Continued)

(58) Field of Classification Search
CPC .......... A61B 17/12181; A61B 17/1214; A61B 17/12113; A61B 17/12177; A61B 17/22032; A61B 2017/00991; A61L 29/145; A61L 29/16; A61M 2025/0057; A61M 2210/125

See application file for complete search history.

(56) References Cited

U.S. PATENT DOCUMENTS

| 3,874,388 A | 4/1975 | King et al. |
| 4,282,875 A | 8/1981 | Serbinenko et al. |

(Continued)

FOREIGN PATENT DOCUMENTS

| WO | WO1997002811 A1 | 1/1997 |
| WO | WO2011057002 A2 | 5/2011 |

OTHER PUBLICATIONS

Fujita S, Tamai H, Kyo E, et al. New technique for superior guiding catheter support during advancement of a balloon in coronary angioplasty: The anchor technique. Catheter Cardiovasc Interv 2003;59:482-488.

(Continued)

*Primary Examiner* — George J Ulsh
(74) *Attorney, Agent, or Firm* — Harris Beach PLLC

(57) ABSTRACT

An endovascular treatment mesh device for closing outpouchings by affixing at least one amorphous hydrogel layer expandable in vivo to any or all surfaces of an expandable body comprising at least one material adapted to close said outpouching in the body. The treatment mesh further includes a telescoping center-support bar disposed therein, the center-support bar having at least two telescoping elements that act as reinforcing extension elements to minimize the risk of collapse. Hydrogel is affixed to the surface of the telescoping elements to inhibit retraction. An embodiment wherein the treatment mesh device is a stent.

19 Claims, 11 Drawing Sheets

Related U.S. Application Data

(60) Provisional application No. 62/497,851, filed on Dec. 5, 2016.

(51) Int. Cl.

| | | |
|---|---|---|
| A61L 29/14 | (2006.01) | |
| A61L 31/10 | (2006.01) | |
| A61L 31/16 | (2006.01) | |
| A61L 31/14 | (2006.01) | |
| A61F 2/852 | (2013.01) | |
| A61F 2/91 | (2013.01) | |
| A61L 31/02 | (2006.01) | |
| A61L 31/04 | (2006.01) | |
| A61L 31/12 | (2006.01) | |
| A61M 25/00 | (2006.01) | |
| A61L 29/16 | (2006.01) | |
| A61B 17/22 | (2006.01) | |
| A61B 17/00 | (2006.01) | |
| A61B 90/00 | (2016.01) | |
| A61F 2/82 | (2013.01) | |
| A61M 25/10 | (2013.01) | |

(52) U.S. Cl.
CPC .. *A61B 17/12031* (2013.01); *A61B 17/12113* (2013.01); *A61B 17/12172* (2013.01); *A61B 17/12177* (2013.01); *A61F 2/852* (2013.01); *A61F 2/91* (2013.01); *A61L 29/145* (2013.01); *A61L 31/022* (2013.01); *A61L 31/04* (2013.01); *A61L 31/10* (2013.01); *A61L 31/125* (2013.01); *A61L 31/14* (2013.01); *A61L 31/145* (2013.01); *A61L 31/146* (2013.01); *A61L 31/16* (2013.01); *A61B 17/12122* (2013.01); *A61B 17/22032* (2013.01); *A61B 2017/00477* (2013.01); *A61B 2017/00867* (2013.01); *A61B 2017/00893* (2013.01); *A61B 2017/00898* (2013.01); *A61B 2017/1205* (2013.01); *A61B 2017/1209* (2013.01); *A61B 2017/320716* (2013.01); *A61B 2090/3966* (2016.02); *A61B 2217/005* (2013.01); *A61B 2217/007* (2013.01); *A61F 2002/823* (2013.01); *A61F 2002/826* (2013.01); *A61F 2220/0033* (2013.01); *A61F 2250/0063* (2013.01); *A61L 29/16* (2013.01); *A61L 2430/06* (2013.01); *A61M 25/10* (2013.01); *A61M 2025/0057* (2013.01); *A61M 2210/125* (2013.01)

(56) References Cited

U.S. PATENT DOCUMENTS

| | | |
|---|---|---|
| 4,346,712 A | 8/1982 | Handa et al. |
| 4,402,319 A | 9/1983 | Handa et al. |
| 4,619,246 A | 10/1986 | Mølgaard-Nielsen et al. |
| 4,675,361 A | 6/1987 | Ward |
| 5,135,516 A | 8/1992 | Sahatjian et al. |
| 5,165,421 A | 11/1992 | Fleischacker et al. |
| 5,263,963 A | 11/1993 | Garrison et al. |
| 5,334,210 A | 8/1994 | Gianturco |
| 5,733,294 A | 3/1998 | Forber et al. |
| 5,907,893 A | 6/1999 | Zadno-Azizi et al. |
| 6,221,086 B1 | 4/2001 | Forber |
| 6,375,670 B1 | 4/2002 | Greenhalgh |
| 6,605,102 B1 | 8/2003 | Mazzocci et al. |
| 7,128,736 B1 | 10/2006 | Abrams et al. |
| 7,575,582 B2 | 8/2009 | Gandhi et al. |
| 8,658,147 B2 | 2/2014 | Sannino et al. |
| 2003/0012816 A1 | 1/2003 | West et al. |
| 2007/0078480 A1 | 4/2007 | Belenkaya et al. |
| 2008/0033341 A1 | 2/2008 | Grad |
| 2008/0208317 A1 | 8/2008 | Jang et al. |
| 2010/0069948 A1 | 3/2010 | Veznedaroglu et al. |
| 2010/0324665 A1 | 12/2010 | Shaw et al. |
| 2011/0144669 A1 | 6/2011 | Becking et al. |
| 2011/0152993 A1 | 6/2011 | Marchand et al. |
| 2012/0158034 A1 | 6/2012 | Wilson et al. |
| 2012/0283811 A1 | 11/2012 | Neilan |
| 2013/0211495 A1 | 8/2013 | Halden et al. |
| 2016/0120551 A1 | 5/2016 | Connor |
| 2016/0249935 A1 | 9/2016 | Hewitt et al. |
| 2017/0245864 A1 | 8/2017 | Franano et al. |

OTHER PUBLICATIONS

Di Mario C. Techniques to enhance guide catheter support. Catheter Cardiovasc Interv 2008;72:505-512.

Mahmood, A. Applications of the Distal Anchoring Technique in Coronary and Peripheral Interventions Cath Lab Digest Oct. 2011 vol. 19—Issue 10.

C. Di Mario et al., "Techniques to Enhance Guide Catheter Support," Catheterization and Cardiovascular Interventions, vol. 72, No. 4, Jun. 16, 2008, Introduction Only, 3 pages.

S. Fujita et al., "New Technique for Superior Guiding Catheter Support During Advancement of a Balloon in Coronary Angioplasty: The Anchor Technique," Catheterization and Cardiovascular Interventions, vol. 59, No. 4, Jul. 25, 2003, Abstract Only, 2 pages.

A. Mahmood et al., "Applications of the Distal Anchoring Technique in Coronary and Peripheral Interventions," Journal of Invasive Cardiology, vol. 23, 2011, 6 pages.

U.S. Appl. No. 16/882,492 filed in the name of Daniel E. Walzman filed May 24, 2020 and entitled "Coated Endovascular Intrasaccular Occlusion Device Method of Use."

COATED ENDOVASCULAR INTRASACCULAR OCCLUSION DEVICE

CROSS-REFERENCES

This application claims priority to patent application Ser. No. 15/732,365 (filing date Oct. 30, 2017) for an "Alternative use for Hydrogel Intrasaccular Occlusion Device with Telescoping Central Support Element" (now U.S. Pat. No. 10,448,970—Issue Date Oct. 22, 2019) and to patent application Ser. No. 15/932,592 (filing date Mar. 2, 2018) for "Coated endovascular devices" (Walzman) which was abandoned (May 9, 2020) less than twelve months from the filing date of this application.

BACKGROUND OF THE INVENTION

Field of the Invention

The present disclosure relates to the field of stent endovascular treatment. More particularly, the present invention combines a modified hydrogel intrasaccular occlusion device tool configured to facilitate aneurysm treatment and a means of targeted drug delivery into a target vascular territory for the treatment of various diseases such as cancer and vasospasms by deploying coated devices such as stents.

Background Art

The present invention is a device which is a combination medical device comprising two components. The first component is a coated endovascular element and the second component is a hydrogel intrasaccular occlusion element. The coated endovascular of hydrogel on the entire surface of any endovascular device exposed to the inner surface of the blood vessel and/or blood products. This should preferably include placing a thin layer of hydrogel over the surfaces exposed to tissue as well. The former may reduce the risk of thrombus formation, and the latter may reduce the risk of unwanted tissue reactions and/or in-stent stenosis.

The hydrogel intrasaccular occlusion element is a tool configured to safely and effectively implement an endovascular treatment of aneurysms. This element also ameliorates or eliminates aneurysm recurrence.

The coated endovascular element disclosed by the present invention is designed in part to address vasospasm. Vasospasm is a common complication that follows aneurysmal subarachnoid hemorrhage (SAH). Prior art comprehensively describes the deficits accompanying vasospasm and, most importantly, made the association between vasospasm and neurological deficits, also known as delayed ischemic deficits (DID).

Vasospasm is one of the leading causes of morbidity and mortality following aneurysmal subarachnoid hemorrhage (SAH). Radiographic vasospasm usually develops between 5 and 15 days after the initial hemorrhage, and is associated with clinically apparent delayed ischemic neurological deficits (DID) in one-third of patients.

The pathophysiology of this reversible vasculopathy is not fully understood but appears to involve structural changes and biochemical alterations at the levels of the vascular endothelium and smooth muscle cells. One theory is that blood in the subarachnoid space triggers these changes. In addition, cerebral perfusion may be concurrently impaired by hypovolemia and impaired cerebral auto-regulatory function. Another theory is that cerebral vasospasm is a spontaneous or secondary reversible vasoconstriction syndrome not associated with an acute subarachnoid hemorrhage.

The prior art discloses various process to ameliorate various vasospasm related medical difficulties. However, said processes can lead to reduction in cerebral blood flow so severe as to cause ischemia leading to infarction. One therapy involves the use of oral Nimodipine, a calcium channel antagonist. It is known to reduce the impact of DID.

Additionally, therapy combining hemodynamic augmentation, transluminal balloon angioplasty, and intra-arterial infusion of vasodilator drugs is also know to reduce the impact of DID. However, these drugs delivered via directed catheter endovascular therapy, are short lasting, which often requires multiple procedures, and limits the overall efficacy. The prior art discloses several drugs, with different mechanisms of action, which also may ameliorate the impact of DID. The coated endovascular element of the present invention offers a means to surmount these short comings.

The hydrogel intrasaccular occlusion element of the present invention discloses structures designed to address structure failure difficulties suffered by an intrasaccular occlusion device used to deliver vasospasm treatments. With respect to the intrasaccular occlusion device, the two most frequent ways that web devices fail and thereby result in an aneurysm recurance are (1) web device collapse and /or compression; and (2) distal migration of the web device into the aneurysm. Additionally, in a ruptured aneurysm there is concern the aneurysm does not close and/or thrombose quickly enough with web devices which has sometimes resulted in recurrent aneurysm rupture after treatment. The present invention is an intrasaccular occlusion devices thatare capable of ameliorating said two most frequent web device failure.

The prior art includes "Left atrial appendage occlusion device," WO 2013/126523 A1 (Erzberger et al.), a device known as Watchman. This is a type of left atrial appendage (LAA) closure technology consisting of a delivery catheter and a device that is permanently implanted in the LAA of the heart. This device prevents LAA blood clots from entering the bloodstream and potentially causing a stroke.

The Watchman device is currently delivered through a 14 Fr (French—Fr=1 mm. diameter) delivery system, and requires a hole of 14 Fr or larger to be made in the femoral vein and the atrial septum for delivery. The larger the hole, the more risk of complication. Said risk includes the risk of stroke associated with atrial fibrillation. The present invention offers a method of serving the same purpose as a Watchman but with a dramatically smaller hole.

Endovascular surgery is a minimally invasive procedure used to treat problems affecting the blood vessels, such as an aneurysm, which is a swelling or "ballooning" of the blood vessel. The surgery typically involves making a small incision near each hip to access the blood vessels.

Endovascular procedures may result in endo-leaks. Said endo-leaks typically involve continued flow of blood outside a covered stent. Unwanted flow is maintained between the outside of the covered stent and the vessel wall, including the aneurysm sac and/or a fistula, if those are the pathology being covered/treated, respectively. This results in continued filling of the pathology that was treated, with continued associated risk to the patient. These endo-leaks occur most often from one of two causes (+/− combination of the two): 1. there can be poor apposition of the wall of the covered stent to the vessel wall, most often at the ends of the stent, especially the proximal end (the end from which blood flow comes). This results in continued flow of blood between the stent and the vessel wall, outside the stent. 2. In some large aneurysms, such as aortic aneurysms, the aneurysm crosses multiple vessel branches, and so when a covered stent is used to treat the aneurysm, these branches are covered. Often some of these branches will start to flow retrograde, and the aneurysm sac can continue to fill—it can even continue to expand and/or rupture.

Endo-leaks can be caused by many factors. Some, such as incorrectly sized stents, can be corrected. Others, such as irregular vessels, branches feeding behind the covered stent (as above), and bends in the vessel at the ideal stent landing zone, often cannot be easily ameliorated.

One possible solution to eliminate or ameliorate endo-leaks may be implemented as follows: the outside of the covered stent can be lined with an adhered hydrogel that once implanted will expand to fill any potential spaces between the vessel wall and the material of the covered stent, thus closing any potential persistent channels outside the stent.

A second possible solution to eliminate or ameliorate endo-leaks may be implemented as follows: the outside of the covered stent can be lined with an adhered hydrogel that once implanted will expand to fill any potential spaces between the vessel wall and/or the wall of the aneurysm sac said stent is treating, and the material of the covered stent, thus closing the aneurysm sac and preventing further flow into it.

A third possible solution to eliminate or ameliorate endo-leaks may be implemented as follows: combining the two-implementation noted above.

These three solutions may be implemented with an existing stent structure because most covered stents consist of Dacron or Polyester and are thus suitable for covering with hydrogel.

Stents and other endovascular devices have issues in that they are thrombogenic when they are first inserted, until they are incorporated into the vessel/endothelialized, or in some cases such as mechanical cardiac valves, forever. This results in significant rates of thrombotic complications, including thrombosed vessels resulting in stroke, myocardial infarction, or other ischemic complications. In order to minimize such risks patients are routinely started on anti-platelet therapy, often dual antiplatelet therapy with agents such as Plavix or Brilinta, and aspirin. In addition, other endovascular devices, particularly those implanted in the heart such as mechanical heart valves, tend to cause a different type of clot that necessitates the use of anticoagulants to protect against clot formation. Although the medications reduce the rate of clot formation, they do not eliminate clot formation altogether and patients can still suffer complications from clotting. Additionally, all these medications have significant rates of bleeding complications. Hydrogel is more inert and does not cause thrombus formation/induction.

Additionally, stent and other foreign body devices when implanted in the body cause a local tissue reaction that can result in local tissue overgrowth. This can result in the development of in-stent stenosis or other issues with scarring. Hydrogel is more inert, and The present invention teaches placing a thin coating of hydrogel on the entire surface of any endovascular device exposed to the inner surface of the blood vessel and/or blood products.

The present invention also teaches placing a thin layer (one (1) nanometer to one (1) centimeter) of hydrogel over a portion of such a device as well. Doing so will reduce but not completely eliminate the risk of thrombus formation. By completely covering these devices with the thin layer of hydrogel a significant reduction of the rate of thrombus formation may be achieved. This will also reduce the need for an anti-platelet and or an anticoagulant.

The reduction in the use of an anti-platelet and or an anticoagulant is a non-obvious benefit of the use of hydrogel as taught above because anti-platelet and anticoagulant medications have significant associated morbidity as well. By eliminating the need for them we can reduce said morbidity further. The hydrogel coating would also reduce the tissue reaction and associated complications such as in-stent stenosis.

The hydrogel can also simultaneously fill any spaces between said stent and the vessel wall, reducing the incidence of endo-leaks, while also helping secure the stent in place, reducing the incidence of stent migration.

Now returning to the coated endovascular aspects of the present invention, a drug-eluting stent (DES) is a well-known medical device. The prior art discloses that a DES is a peripheral or coronary stent placed into narrowed, diseased peripheral or coronary arteries that slowly releases a drug to block cell proliferation. Said release may prevent fibrosis that, together with clots (thrombi), could otherwise block the stented artery. The DES device is usually placed within the peripheral or coronary artery.

Drug-eluting stents in current clinical use were approved by the FDA after clinical trials showed they were statistically superior to bare-metal stents for the treatment of native coronary artery narrowings, having lower rates of major adverse cardiac events such as myocardial infarctions. The first drug-eluting stents to be approved in the U.S. were coated with Paclitaxel or an mTOR inhibitor, such as Sirolimus.

The use of DES decreases the risk of in-stent stenosis by preventing fibrosis. The use of DES, however, also delays endothelial regrowth over the stent, and is associated with an increased risk of in-stent thrombosis.

The use of covering the surface of a stent with hydrogel and/or the use of hydrogel infused with certain medications may ameliorate or eliminate the tendency of stents to thrombose without the use of dual antiplatelet therapy, as well as the tendency of stents to cause a tissue reaction at the implantation site that can lead to in-stent stenosis, whether in a vessel, ureter, bile duct, or other organ. The use of a thin layer of hydrogel covering the surfaces of stents can reduce or eliminate the thrombogenic tendency, thus reducing or eliminating the need for antiplatelet therapy and their associated risk, as well as reducing or eliminating undesired thrombus formation.

Additionally, medications can be adhered directly to stents and/or in hydrogel lining stents, so that a prescribed dose of said medication will be released over a prescribed time, for a local effect in that particular vessel's perfusion territory. This local selective delivery will often reduce undesired systemic effects of said medication, while often increasing local efficacy.

Stents and other endovascular devices such as mechanical cardiac valves can have consequences in that they are thrombogenic when first inserted, until they are incorporated into the vessel/endothelialized, or in some cases permanently. This results in significant rates of thrombotic complications, including thrombosed vessels resulting in stroke, myocardial infarction, or other ischemic complications. In order to minimize such risks patients are routinely started on antiplatelet therapy, often dual antiplatelet therapy with agents such as Plavix (clopidogrel) or BRILINTA® (ticagrelor), and aspirin. Alternatively, as is the case with many cardiac valves, patients are started on anticoagulants, such as Coumadin.

In addition, other endovascular devices, particularly those implanted in the heart such as mechanical heart valves, tend to cause a different type of clot that necessitates the use of anticoagulants to protect against clot formation. Although the medications reduce the rate of clot formation, they do not eliminate clot formation altogether and patients can still suffer complications from clotting. Still further, all these medications have significant rates of bleeding complications.

Hydrogel is more inert than metals and some plastics and other common materials, and does not cause thrombus formation/induction. Furthermore, a study published in the Journal of the American College of Cardiology: Basic to Translational Science, reported that an injectable gel can maintain its healing characteristics. In particular, rebuilding of muscular structures was reported from a gel originally derived from a pig's cardiac muscle tissue, which was stripped of cells until all that was left was an extracellular matrix. A 2010 study in the Journal of Cell Science noted that an element of gel used in the aforementioned Journal of the American College of Cardiology study was responsible for tissue regeneration and re-growth: One non-limiting version of a hydrogel that expands in the body is a co-polymer of acrylamide and sodium acrylate cross linked.

The prior art teaches uniform distribution of medication along the stent. For example, U.S. Pat. No. 8,367,151 (O'Brien et al.) teaches a sputtered coating "that is evenly distributed over the outward-facing side of the stent's wire mesh" (Abstract). Such even distribution is ideal for treating tissue in proximity to the stent. It is suboptimal for the treatment of tissue downstream of the stent. It is, therefore, desirable to have devices incorporating a hydrogel coating, usually a thin coating of same in interventional, intravascular and other lumina organ therapies.

There is a need for a broader spectrum of stents with an adhered "medium" that carries and slowly releases medication into the blood stream (as opposed to current medicated stents, whose medication is designed to inhibit local tissue reaction to reduce intimal hyperplasia and in-stent stenosis). There is a need to release medication into blood, over a prescribed time, rather than using such medication for a purely local effect.

The hemodynamics of arterial blood flow describes the mechanical properties and the interactions between blood flow and vascular walls. More specifically, hemodynamics describes the kinematics and dynamics of blood flow and obeys the laws that govern the mass and momentum of fluid elements.

The blood vessels have the ability to respond to hemodynamic stimuli, including the stretch and shear stress resulting from flow and circulatory (transmural) pressure. This ability is mainly mediated by vascular endothelial cells, which are in direct contact with blood flow.

In fluid dynamics, laminar flow (or streamline flow) occurs when a fluid flows in parallel layers, with no disruption between the layers. At low velocities, the fluid tends to flow without lateral mixing, and adjacent layers slide past one another like playing cards. There are no cross-currents perpendicular to the direction of flow, nor eddies or swirls of fluids. In laminar flow, the motion of the particles of the fluid is very orderly with particles close to a solid surface moving in straight lines parallel to that surface.

When a fluid is flowing through a closed channel such as a blood vessel either of two types of flow may occur depending on the velocity and viscosity of the fluid: laminar flow or turbulent flow. Laminar flow tends to occur at lower velocities, near the wall of a closed channel. Turbulent flow tends to occur at the end of a tube.

Turbulent flow is a less orderly flow regime that is characterized by eddies or small packets of fluid particles, which result in lateral mixing. In some embodiments, the present invention uses this physical phenomenon to move small packets of pharmacological compounds from the outer surface of the present invention to the center of a vessel channel and thus further downstream than eluting stents disclosed by the prior art.

The prior art discloses stents which release medications. However, said stents are specifically designed to deliver pharmaceutical compounds to the local area, immediately at the sight of stent implantation, wherein the medication is released.

Said prior art discloses stent-eluding medication slowly released directly into the adhered tissue of the vessel wall, rather than into the blood. Any minute amount of medication flowing into the blood and downstream is an unintended consequence. The prior art indicates that said downstream waste should be minimized by the use of fast-acting medications.

The prior art discloses structures which enhance release of medication to tissue proximal to the stent, whereas the present invention is designed to minimize medication proximal to the stent. In some embodiments present invention does so by infusing a higher density of medication at the downstream end than the upstream end of the stent, such that blood is channeled around the downstream concentration. The stent is designed to cause turbulent flow just beyond the downstream edge of the device, causing the medication to flow from the outer surface of the downstream end of the device into the center of the vessel. As a result, the outer coating is channeled to the turbulent flow (which is in the center of the vessel) rather than the laminar flow stream, thus enhancing the distance the medication can flow before it settles on the vessel wall or bed.

In other embodiments the preponderance of the medication is on the internal surface of the stent, in direct contact with the blood as it continuously flows through the stent, rather than on the outer surface of the stent. This facilitates release of the drug into the bloodstream.

The coated endovascular elements of the present invention substantially address the foregoing a number of unmet needs noted above and the hydrogel intrasaccular occlusion element of the present invention substantially fulfills the balance of said forgoing unmet needs.

More particularly, with respect to the hydrogel intrasaccular occlusion element of the present invention, a gel is a solid jelly-like material that can have properties ranging from soft and weak to hard. A hydrogel is a network of polymer chains that are hydrophilic, sometimes found as a colloidal gel in which water is the dispersion medium. These may be woven and/or adhered to the metal structures as well. In addition to aiding the wound treatment, hydrogel has been shown to offer relief from pain for hours after application. Furthermore, the expansion of the hydrogel after it is implant into the body may increase the coverage of a metal mesh implanted and thereby decrease permeability of blood into the aneurysm, promoting faster thrombosis and healing of the aneurysm.

Hydrogel dressings consist of 90 percent water in a gel base, and serves to help monitor fluid exchange from within the wound surface. The application of hydrogel assists in protecting areas adversely affected during endovascular treatments from wound infection and promotes efficient healing. Hydrogel dressings generally come in three different forms (which constitute various release mechanisms), including: amorphous hydrogel: a free-flowing gel, distributed in tubes, foil packets and spray bottles; impregnated hydrogel: typically saturated onto a gauze pad, nonwoven sponge ropes and/or strips; and sheet hydrogel: a combination of gel held together by a thin fiber mesh.

Luna Aneurysm Embolization system (LAA) or similar devices or systems. Once done, and deployed in the body the hydrogel expands and further decreases the permeability of the device to blood. This can facilitate more immediate thrombosis of the aneurysm, resulting in more immediate reduction in the risk of the aneurysm rupturing.

The present invention can be used to close an LAA. It has specific advantages when compared to the Watchman device. In particular, Watchman is delivered through a "transseptal" approach, coming from the femoral vein, into R atrium of heart, and across the atrial septum (a hole needs to be made) and into the left atrium, from where the left atrial appendage is then accessed. The current Watchman is delivered through a 14 Fr system. So compared to the present invention, a much larger hole in the femoral vein, with corresponding increased risk of bleeding complications and/or vessel injury must be made. Additionally, a much smaller holein the septum can be used for access if implanting the present invention in the left atrial appendage, via a transseptal approach, instead of the Watchman. The present invention can be delivered through systems smaller than 4 Fr (sometimes as small as 2.1 Fr; but probably not that small for the 21-33 mm wide device needed in the left atrial appendage). The current invention can be delivered in appropriate sizes through systems from 2 Fr to 11 Fr.

The present invention is capable of larger webs that can easily be delivered through catheters considerably smaller than the current 14Fr Watchman. This will allow the current invention to be more effective in eliminating or ameliorating blood clots from entering the bloodstream and potentially causing a stroke.

The present invention uses a device designed to facilitate endovascular treatment by adding hydrogel along the metal struts/web of the device and using it to prevent episodes of distal migration due to addition of hydrogel. This is achieved by providing expanded hydrogel extends outside the device on the sides of the device. Said extensions will help "grip" the aneurysm walls and minimize the incidence of migration. In addition to said extensions to help speed thrombosis and minimize risk of collapse, the center open space within the web can have added strands and/or struts and/or bars of hydrogel. Said extensions can be oriented vertically for added support, to further minimize the risk of device collapse.

The present invention in all embodiments will be partially or fully covered by a thin coating of hydrogel. Said coating acts as both a medication delivery system and a barrier to reduce the thrombogenicity of the stent, reducing thrombotic complications, and reducing the need for antiplatelets (with their associated potential hemorrhagic complications—especially in patients with a recent bleed in their brain).

The present invention teaches the affixation of at least one hydrogel layer that expands in vivo to any or all surfaces of a mesh intrasaccular device made of at least one material adapted to close an outpouching in the body such as an aneurysm, the left atrial appendage, or diverticulae of other organs. For purposes of this invention, hydrogel coating will be in a non-hydrated state and will expand in use, upon exposure to bodily fluid.

The current device may be used to treat both venous and arterial aneurysms. It may be used in the brain, the peripheral vasculature, and the arterial vasculature.

SUMMARY OF THE INVENTION

The present invention is a device which combines a means of targeted drug delivery into a target vascular territory. The first is the coated endovascular element and the second is the hydrogel intrasaccular occlusion element. Said second element is fully summarized and disclosed in "Alternative use for Hydrogel Intrasaccular Occlusion Device with Telescoping Central Support Element" (now U.S. Pat. No. 10,448,970, Issue Date Oct. 22, 2019).

The first (the coated endovascular component) element of the current invention places a thin coating of hydrogel on the entire surface of any endovascular device exposed to the inner surface of the blood vessel and/or blood products. This should preferably include placing a thin layer of hydrogel over the surfaces exposed to tissue as well. The former may reduce the risk of thrombus formation, and the latter may reduce the risk of unwanted tissue reactions and/or in-stent stenosis.

In other non-vascular embodiments, the hydrogel can be on all layers, or on the outer surface alone. When the inner surface of the stent is not exposed to blood, there is sometimes less need to prevent interaction of the inner surfaces of the stent.

By completely covering these devices with the thin layer of hydrogel, medical practitioners can significantly reduce the rate of thrombus formation and thus reduce the need for antiplatelet and or anticoagulant. Antiplatelet and anticoagulant medications have significant associated morbidity as well. By eliminating the need for them, morbidity can be reduced further. Furthermore, by reducing exposure of the stent or other medical device to the tissue in which it is implanted, local tissue reactions, which can cause in-stent stenosis, scar tissue, and other complications, can often be avoided.

A thin layer of hydrogel placed on any vascular stent (e.g., cardiac or other) reduces a tendency for thrombosis, and further reduces the need for dual antiplatelet therapy. Reducing interaction between metal and tissue in both vascular and non-vascular stents also reduces rates of intimal hyperplasia and in-stent stenosis.

Non limiting examples of endovascular devices that can be covered with such a layer of hydrogel include metal stents, covered stents, cardiac valves, left atrial appendage occlusion devices such as the Watchman, intra-saccular aneurysm devices (such as U.S. application Ser. No. 15/732,365), pressure monitors, wires, and leads. The prior art discloses that medical devices with exposed metal are inherently dangerous, and further discloses covering metals with plastics, and/or polyesters, and/or Dacron, among other coverings. Prior art discloses hydrogel for plugging aneurysms but has not disclosed hydrogel as an agent for covering metal because most forms of hydrogel do not readily adhere to metal. The present invention employs hydrogel for the purpose of coating metal, plastics, and other implantable foreign materials. The present invention also deploys hydrogel adhered to implantable medical devices as well as for delivering medication as well.

If hydrogel is placed around all surfaces, including the surface pressing on the vessel or other organ wall, it will help reduce the rate of intimal hyperplasia caused by the tissue reacting to the foreign body. Intimal hyperplasia causes lumina narrowing and/or occlusions. In some cases, pressure may appear on the outer wall as well.

The present invention in all embodiments will be partially or fully covered by a thin coating of hydrogel. Said coating can act as a barrier to reduce the thrombogenicity of the stent when placed intravascularly, reducing thrombotic complications, and reducing the need for antiplatelets (with their associated potential hemorrhagic complications—especially in patients with a recent incident of brain-bleeding). Said coating can also reduce tissue reaction to the stents. Additionally, said coating can act as a medication delivery system.

The present invention teaches the affixation of at least one hydrogel layer that in vivo to any or all surfaces of a stent made of at least one material adapted from a stent and other medical devices for various uses in the human or animal body. For purposes of this invention, hydrogel coating will be in a non-hydrated state in packaging, and will be hydrated to its full expansion either immediately before implantation, or it will preferably expand in the body in use, upon exposure to bodily fluid.

The current invention may be used in the brain, the peripheral vasculature, and the cardiac vasculature. It may be used in arteries, veins, and lymph vessels. It may be used in ureters, tracheas, bile ducts, and other lumina' organs. The current invention is configured to fill bodily lumens and outpouchings. For example, in the intravascular tract (zone), it fills outpouchings, whereas in the intestinal tract it fills the intestinal lumen or outpouchings therein. Outpouchings generally require one support elements, but at least one in a lumen. In some embodiments, the reinforcement member is a catheter.

The present invention discloses a device for any stent to which any medication is directly adhered or adhered to a medium that is adhered to the stent, wherein said medication releases into the blood (i.e. the medication is delivered via the stent into the blood and to the vascular bed supplied by that vessel, and to the tissue of that vascular bed), in contrast to current drug-eluting stents, wherein the drug is on the stent for the local tissue effect of the drug, not for release into the blood and downstream therapy. One example of a medium to carry said medication for release is hydrogel.

Cardiac prosthesis is any material surgically implanted in the heart to replace a heart element that has become damaged due to heart valve disease. Cardiac prosthesis includes but is not limited to valves, wires, pumps, and stents. Said cardiac prosthesis may also be coated with hydrogel.

BRIEF DESCRIPTION OF THE DRAWINGS

The invention will be better understood and objects other than those set forth above will become apparent when consideration is given to the following detailed description thereof Such description makes reference to the annexed drawings wherein.

Note that hydrogel coating is depicted in the foregoing Figures as mis-formed circles or beads as being representative only, and said circles or beads shown are not drawn to scale.

DETAILED DESCRIPTION OF THE INVENTION

The first (the coated endovascular component) element of the current invention teaches the placement of hydrogel within or coating surfaces of intravascular devices and stents, which are often delivered proximally to target area using a stent allowing for the implementation of a therapeutic endovascular treatment.

Figure 10A:
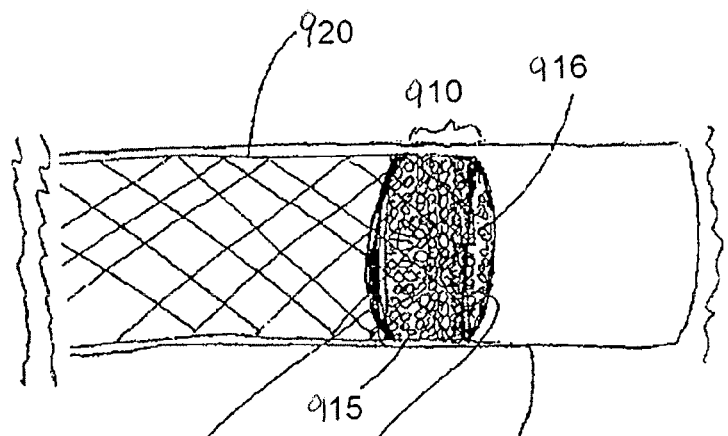
FIG. 10A and FIG. 10B are planar views showing a stent covered in hydrogel depicted as mis-formed circles or beads; a reinforcement member is not shown.
Figure 10B:
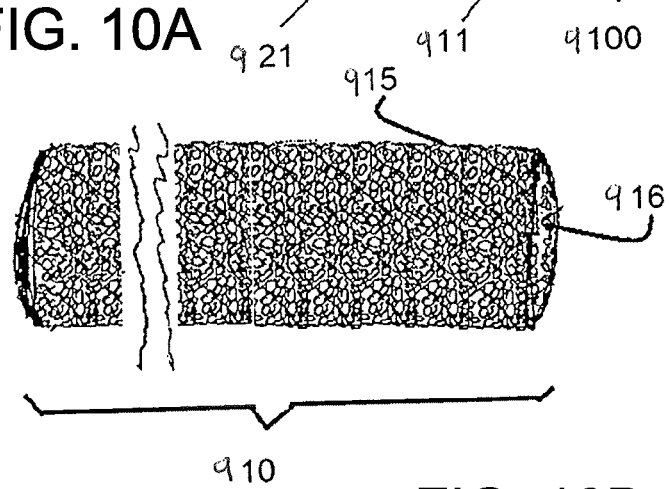

Referring now to FIGS. 10A and 10B, a stent 910 disposed upon a delivery device 920. Stent 910 is shown deployed within vessel wall 9100. A reinforcement member (not shown), at least one support bar is configured to attach to opposing sides within stent 910 oriented perpendicularly to the longitudinal axis of the lumen. Said support element may be a spring, a piston, a telescoping element, an umbrella-like element, without limitation.

Stent 910 includes a distal end 911. Delivery device 920 has a distal end 921.

Stent 910 is coated with hydrogel 22 or 915 or 916. Hydrogel 22 or 915 or 916 is typically amorphous. It is adhered to all or select surfaces of stent 910 or other intravascular device. For purposed of clarity, 915 refers to hydrogel on the outer surfaces of a structure, 916 refers to hydrogel on the outer surfaces of a structure and 22 refers to hydrogel on the outer surfaces of a structure and the inner surface of a structure.

In a preferred embodiment, stent 910 is covered with a one (1) nanometer to one (1) millimeter layer of hydrogel 915 or 916 to prevent thrombosis and tissue reactions. Another embodiment includes impregnating medications into hydrogel 915 or 916 on stent 910. This alternate embodiment may have multiple subgroups including chemotherapy and vasodilator agents, among others. This embodiment could also have multiple applications for treatment of cancer, vasospasm, and other diseases, with varying the medications and the location of the stent.

Figure 11:
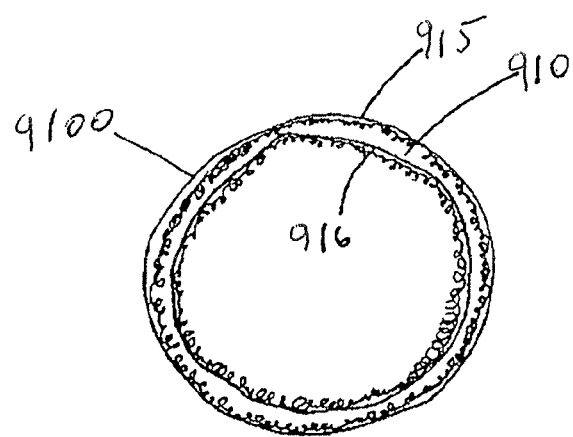
FIG. 11 depicts a cross-section of the embodiment of the present invention shown in FIGS. 10A-B, situated within in a mammalian vessel, without showing the delivery system.

FIG. 11, is a cross-section of deployed covered stent 910 within vessel wall 9100, showing hydrogel coating on the outer surface 915 and the inner surface 916.

When said coated device 910 is employed in an endovascular treatment, the exposure of the adhered added hydrogel 915 or 916 with the device 910 to the blood and temperature in the body causes it to expand further, decreasing the permeability of device 910 to blood and which decreases the risk of the aneurysm rupturing or clots forming and embolizing.

The present invention uses a device designed to facilitate endovascular treatment by coating hydrogel along delivery device 920 to prevent episodes of distal migration due to addition of hydrogel 915 and 916.

In one embodiment of the current invention a thin coating of hydrogel 915 and 916 is placed on all surfaces, including the surface pressing on the vessel wall to reduce the rate of intimal hyperplasia caused by the vessel reacting to the foreign body. This results in a non-obvious benefit of the use of hydrogel 915 and 916 because vasospasms turn cause sub-optimal outcomes, including in some cases the death of the patient.

The thickness of the hydrogel 915 and 916 coating on the stent 910 would be from the minimum possible thickness of approximately one nanometer or less, up to one centimeter in 14 thickness. However, for most carotid and vertebral artery applications the preferred thickness is one millimeter or less.

In general, dosage depends on the specific medication and the intended task. For example, Verapamil 2 mg/hr. and Cardene 100 mcg/hr. are non-limiting examples of medication doses that are released to the blood for cases of vasospasm. Various possible vasodilators, including and not limited to the ones listed herein may be infused for treating vasospasms; any chemotherapy agent may be employed for treatment of cancer.

In alternate embodiments (not shown), hydrogel 915 and 916 is lined onto nonvascular stents 910, such as biliary and ureter stents, to reduce rates of in-stent stenosis; and may help anchor the stent 910 in place and prevent stent migration.

In another alternate embodiment (not shown), hydrogel 915 and 916 does not fill the interstices between metal areas of stent 910.

In alternate embodiments, hydrogel may be coated on such devices as a delivery mechanism of medications, which can be immediate release or controlled sustained slow release. Slow, local release of adhered medications is also useful in treating certain cancers.

In some embodiments, a bio-degradable hydrogel is employed. In another embodiment, a non-biodegradable hydrogel, that will be permanent, may be employed.

In some embodiments said additional coating includes chemotherapy compounds in said thin coating of hydrogel. As examples, said chemotherapy compounds embedded a device may be used in the carotid artery for a brain tumor in that vascular distribution, or in right renal artery for a right kidney tumor, or in right pulmonary artery for a right lung mass. This could allow sustained delivery locally, while minimizing the systemic dose and associated side effects.

Said hydrogel thin coating may be impregnated with pharmaceutical compounds to ameliorate vasospasm. Said compounds may include, but are not limited to nimodipine, Verapamil, Cardene, nitroglycerin, and nitroprusside. Said compounds may be formulated for immediate release or controlled sustained slow release.

By way of non-limiting example, impregnating hydrogel adhered to a stent with Verapamil that is released over two weeks, and placing said stent in carotid artery, may be used to treat intracranial vasospasm. In addition or in the alternative, impregnating hydrogel adhered to a stent with a slow release chemotherapy agent, allowing selective delivery over a time to a single organ, with lower systemic doses, is likely to lead to fewer side-effects. It may allow higher and more effective local doses of medication as well.

To minimize the risk of severe symptomatic vasospasm in aneurysmal sub-archnoid hemorrhage (a typical bleed from a ruptured brain aneurysm) or other intracranial vasoconstriction syndrome, the said thin coating of hydrogel might include a vasodilator compound that slowly releases over two to four weeks. Said medication infused hydrogel can be embedded in a stent for placement in the common or internal carotid arteries on one or both sides, and/or the placement in one or both vertebral arteries. Non-limiting examples of vasodilators that can be embedded include nimodipine, Verapamil, Cardene, nitroglycerin, and nitroprusside. They can be implanted therapeutically after vasospasni is identified. In some cases, they can be implanted prophylactically, before the onset of vasospasm.

The objective of the present invention is to deliver pharmaceutical compound(s) downstream from the stent 910. The present invention teaches four techniques to achieve this objective in a manner which is superior to the prior art.

First, the hydrogel 915 and 916 which contains the pharmaceutical compounds is located both inside and outside the stent 910 wall. Said positioning allows blood flowing through stent 910 to leach medication from hydrogel 915 or 916. Said blood flow then delivers said pharmaceutical compounds downstream of stent 910. Hydrogel 916 (interior surface) differs from the prior art because the prior art deposits the pharmaceutical compound directly on the outer surface of a (typically) metal stent.

When the prior art devices release the pharmaceutical compounds, they expose metal surfaces either inside the prior-art stent, thus harming the blood, or outside the metal stent, thus harming the vessel tissue in contact with the vessel wall 9100. In light of the fact that it is known that exposure of blood to metal causes injury, the present invention in its preferred embodiment uses an intermediate compound such as hydrogel 915 or 916, which covers the stent 910 both inside and out, after the medication has been leached away, thus preventing injury of the metal contact with either the blood or the vessel wall 9100. Coating hydrogel 916 inside stent 910 allows superior downstream results as compared to prior-art devices.

The second technique to enhance superior downstream results, when compared to the prior art, is the present invention's asymmetrical distribution of the hydrogel 915 and 916, in some embodiments. By placing relatively more hydrogel 915 and 916 toward the downstream end of stent 910, pharmaceutical compounds are more likely to exit stent 910 and travel further from stent 910 then if the compounds were uniformly distributed on a stent 910, as disclosed by the prior art.

The third technique, in some embodiments, is to shape the inside of stent 910 to produce spiral flow. Said shaping may be achieved by either forming internal spiral ridges on the inside of stent 910, or plating the inside of stent 910 with spiral mounds of hydrogel 915 and 916. Either the spiral ridges coated with hydrogel or spiral mounds of hydrogel will result in changing the course of the blood flow through stent 910. More particularly, such spiral-coated structures or mounds will cause the blood flow through stent 910 to spiral. Such spiraling will encourage turbulent flow. Turbulent flow has a well-known characteristic of clumping particulate matter such as pharmaceutical compounds in the center of the flow. Particulate matter in the center of the flow will go further downstream than particulate matter under laminar-flow conditions.

The fourth technique, in some embodiments, is to make the downstream stent 910 opening smaller than the upstream stent 910 opening. It is well known that constricting a fluid results in turbulent flow. Therefore, for the reasons noted above, pharmaceutical compounds will travel in the center of the flow further downstream than stents with similarly sized openings, as disclosed by the prior art.

The foregoing four techniques, individually or in a combination of one or more of these techniques, may also be used to control the amount and distance the pharmaceutical compounds will be sent downstream in addition to allowing superior downstream range of pharmaceutical-compound delivery as compared to the prior art.

The present invention can alternatively be used by embedding or impregnating pharmaceutical compounds medications in stent 910 for local delivery, short release or sustained release, using permanent non-degradable hydrogel or biodegradable hydrogel. The following are non-limiting embodiments.

Placing a stent with chemotherapy embedded into carotid artery for a brain tumor in that vascular distribution, or in right renal artery for a right kidney tumor, or in right pulmonary artery for a right lung mass. This could allow sustained delivery locally, while minimizing the systemic dose and associated side effects.

Similarly, to minimize the risk of severe symptomatic vasospasm in aneurysmal sub-archnoid hemorrhage (a typical bleed from a ruptured brain aneurysm), a vasodilator that slowly releases over time can be embedded in stent 910 for placement in the common or internal carotid arteries on both sides, with optional additional placement in one or both vertebral arteries. Non-limiting examples of vasodilators that can be embedded include nimodipine, Verapamil, Cardene, nitroglycerin, and nitroprusside.

The coating an endovascular device is device independent. The location of said coting is also device independent. While one embodiment is the stent 910 and the delivery device 920, an alternated embodiment disclosed by the present invention teaches the placement of amorphous hydrogel (22) within or coating surfaces of intrasaccular occlusion devices, which are delivered proximally to target vessels using wire delivery systems (12). Said intrasaccular occlusion devices are typically housed in intrasaccular tools during the transport process.

Coating said intrasaccular occlusion devices, particularly an extension such as treatment mesh (20), allows for the implementation of a therapeutic endovascular treatment.

Said amorphous hydrogel (22) is adhered to select surfaces of said device (20) designed to implement an endovascular treatment and is contained by said device designed to implement an endovascular treatment. Alternatively, said amorphous hydrogel (22) is adhered to select surfaces of said device (20) designed to implement an endovascular treatment or is contained by said device designed to implement an endovascular treatment. These alternatives are not necessarily mutually exclusive.

When said coated device designed to implement an endovascular treatment is proximately positioned at the treatment point, and the metal mesh device (20) such as the Sequent Web or Luna Aneurysm Embolization system or similar system is deployed in the body, the exposure of the adhered added hydrogel with the device to the blood and temperature in the body causes it to expand further, decreasing the permeability of the device to blood and promoting more immediate thrombosis of the aneurysm or other vascular outpouching, which results in more immediate decrease in the risk of the aneurysm rupturing or clots forming and embolizing.

The present invention uses a device designed to facilitate endovascular treatment by coating hydrogel along the metal struts/web of the device and uses it to prevent episodes of distal migration due to addition of hydrogel. This is achieved by providing expanded hydrogel extends outside the device on the sides of the device. Said extensions will help "grip" the aneurysm walls and minimize the incidence of migration. Additionally, said extensions help speed thrombosis and minimize risk of collapse. The center open space within the web can have added strands and/or struts and/or bars of hydrogel as well. Said extensions can be oriented vertically for added support. Said extensions can be oriented in either direction as well.

More particularly, said extensions which may be made of hydrogel coated metal, metal alloys, or plastic, or other stiff material and may be integrated into the web element of the hydrogel intrasaccular occlusion device as bars and/or struts, or segments. Said extensions may also be reinforced portions of the web itself, reinforced with stiffer metal or material, that might also minimize the potential for collapse. All said reinforced elements may be further enhanced by the addition of hydrogel to these various metal bars and struts as well, especially at the center of the "spring." All said reinforcements may also sometimes not be further enhanced by hydrogel.

The present invention can be used with hydrogel. Each embodiment may be used to treat brain aneurysms, and heart ailments.

The preferred embodiment would include one or more of the following extensions and reinforcements:
radial stiff bars, oriented vertically (can be metal, plastic, any other non-compressible material);
1. vertically oriented regions of reinforced mesh;
2. simple center support bar/stick (somewhat difficult thought, since device shortens as it expands when deployed);
3. Telescoping central bar or stick, with preset final minimum bar height;
4. Bar with radial support struts, like an umbrella. Can have supports on bottom, top, or both; and
5. Spring of preset coil height. The spring straightens in delivery sheath catheter (like a Merci device).

All of the above extensions may be added with a hydrogel coating on all parts. All of the above extensions may be added with a hydrogel coating on some parts. In some embodiments all of the above extensions may be added without a hydrogel coating on some parts. In some embodiments any of the above extensions may be added without any hydrogel coating at all.

All of the above extensions may be covered in a thin coating of hydrogel on the entire surface of any endovascular device exposed to the inner surface of the blood vessel and/or blood products, by placing a thin layer of hydrogen over a portion of such a device as well.

In the preferred embodiment of the current invention endovascular devices that can be covered with such a layer of hydrogel include metal stents, covered stents, cardiac valves, left atrial appendage occlusion devices such as the Watchman, intra-saccular aneurysm devices, pressure monitors, wires/Leeds Etc. In short, all surfaces of the present invention and devices which deploy the present invention would be cover with a thin layer of hydrogel and thereby covering all metals, and/or plastics, and/or polyesters, and/or Dacron surfaces.

In the preferred embodiment of the current invention a thin coating of hydrogel is placed on all surfaces, including the surface pressing on the vessel wall, it will reduce the rate of intimal hyperplasia caused by the vessel reacting to the foreign body. This result is also a non-obvious benefit of the use of hydrogel because intimal hyperplasia causes vessel narrowing and/or occlusions, which in turn causes suboptimal outcomes, including in some case the death of the patent.

In the preferred embodiment of the current invention a thin coating of hydrogel is placed on all surfaces of all devices which deliver the Claim 1 devices (an extension element for an intrasaccular occlusion tool designed to ameliorating aneurysm recurrences by deploying an amorphous hydrogel), then said hydrogel may be use to both prevent blood metal thrombosis and as a delivery mechanism for medications, which can be immediate release or controlled sustained slow release (embedded in stents or other devices).

For example, hydrogel lining to nonvascular stents, some embodiments include biliary and ureter stents, that may also reduce rates of in stent stenosis; and may help anchor the stent in place and prevent stent migration.

In some embodiments of the current invention, coatings in addition to a thin coating of hydrogel are added to said thin coating of hydrogel. Said additional coating additives embed said thin coating of hydrogel with compounds for local delivery, short release or sustained release.

In some embodiments said additional coatings include chemotherapy compounds in said thin coating of hydrogel. Said chemotherapy compounds embedded a device may be used in the carotid artery for a brain tumor in that vascular distribution, or in Right renal artery for a right kidney tumor, or in right pulmonary artery for a right lung mass: this could allow sustained delivery locally, while minimizing the systemic dose and associated side effects.

Said hydrogel thin coating may be impregnated with pharmaceutical compounds. Said compounds may include, but are not limited to nimodipine, verapamil, Cardene, nitroglycerin, and nitroprusside. Said compounds may be formulated for immediate release or controlled sustained slow release.

Alternatively, to minimize the risk of severe symptomatic vasospasm in aneurysmal subarachnoid hemorrhage (a typical bleed from a ruptured brain aneurysm) the said thin coating of hydrogel might include a vasodilator compound that slowly releases over 3 weeks can be embedded in a stent for placement in the common or internal carotid arteries on both sides, including the placement in one or both vertebral arteries. Non-limiting examples of vasodilators that can be embedded include nimodipine, verapamil, Cardene, nitroglycerin, and nitroprusside.

Figure 1:
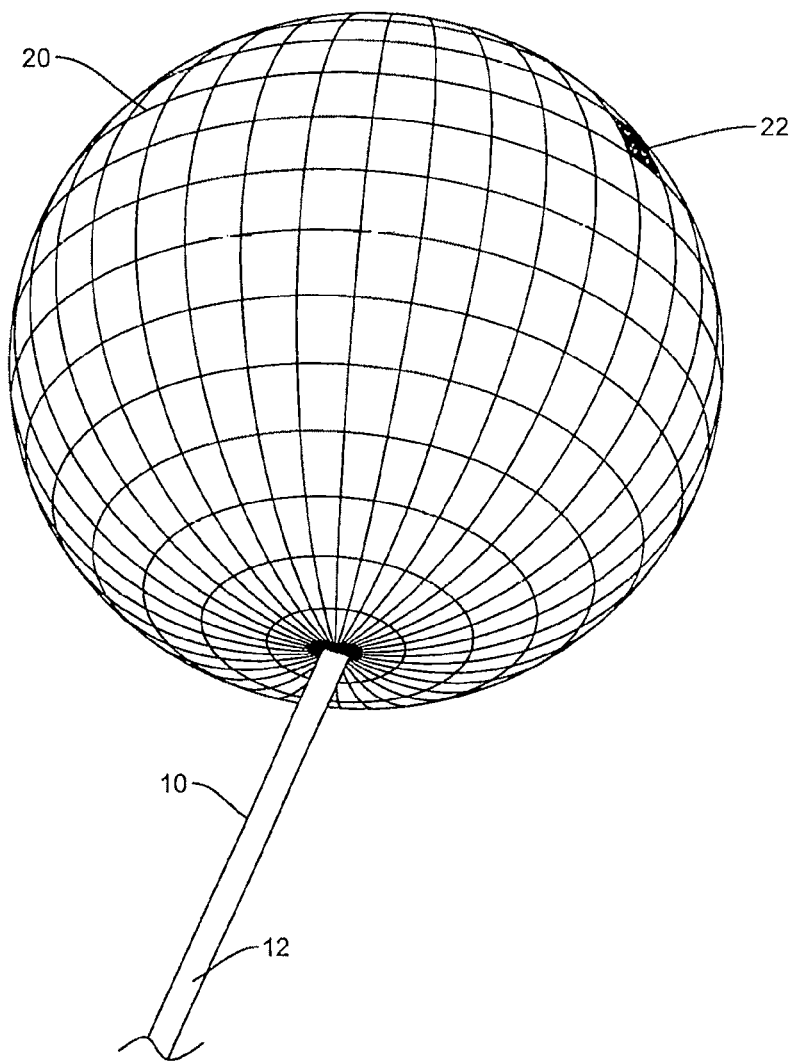
FIG. 1 showing at distal end of wire (12) deployed device (10) designed to implement an endovascular treatment mesh (20) at treatment site with hydrogel coating (22).
Figure 2:
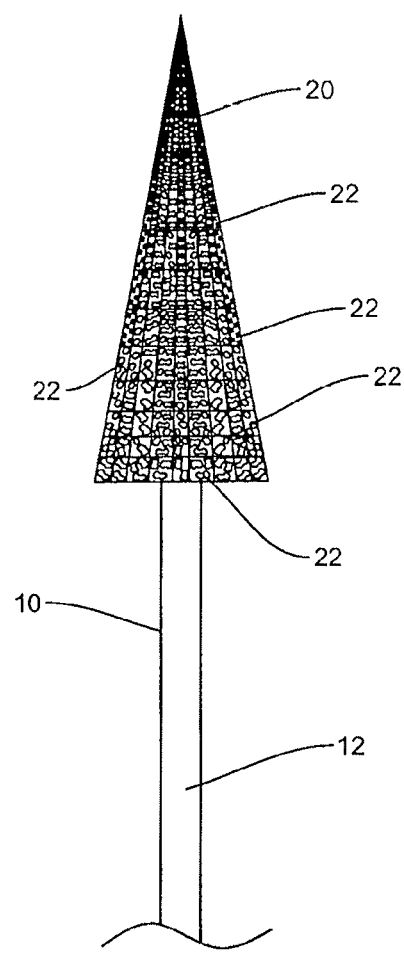
FIG. 2 showing at distal end of wire (12) showing an un-deployed device designed to implement an endovascular treatment mesh (20) with hydrogel coating (22).
Figure 3:
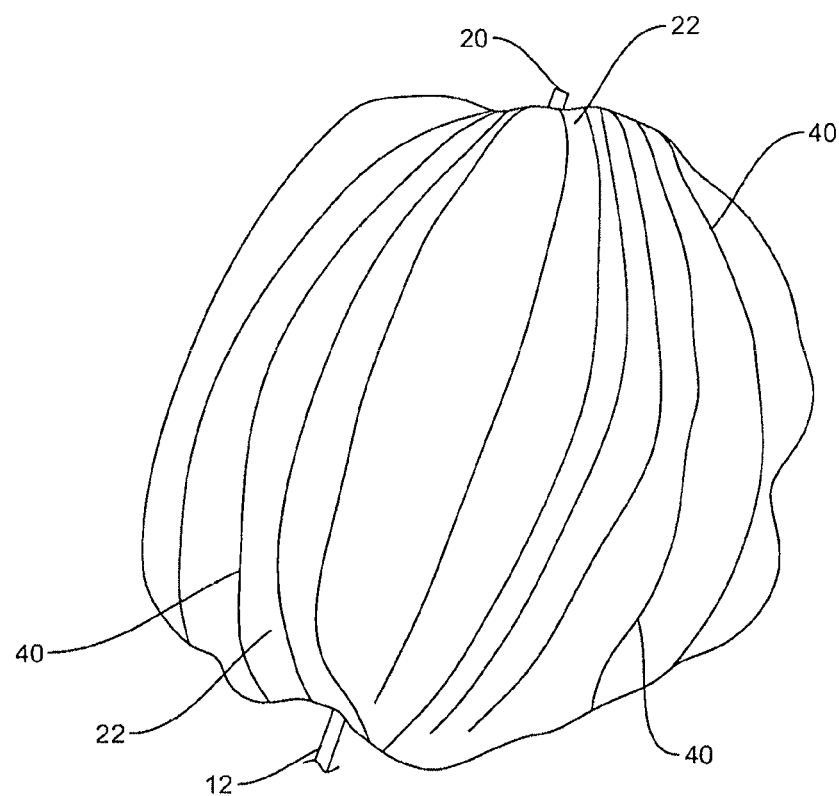
FIG. 3 showing at distal end of wire (12) deployed device designed to implement an endovascular treatment mesh (20) with hydrogel coating (22), further including radial stiff bars (40) in vertical orientation.

As more particularly shown in FIG. 1, delivery wire (12) with mesh device (20) disposed at the distal end of said wire (12). Treatment mesh (20) is designed to be implemented at a treatment site with a hydrogel coating (22). Deployed device (10) is distally attached to a delivery system which may be as simple as a wire (12) but may be an intravascular tool (not shown) such as a nonvascular stent. In the preferred embodiment, such delivery tools would also be coated with a thin coating of hydrogel (22), preferably having a thickness of one nanometer to one centimeter. Said thickness is determined by the internal diameter of the target area, and the outer dimension of treatment mesh (20). FIG. 2 depicts the same treatment mesh (20) prior to deployment, as well as wire (12). The coating must be sufficiently thin so that the unhydrated hydrogel (22) will allow treatment mesh (20) to proceed proximally to the target area in an undeployed state. For example, if the internal target area of the vessel has a diameter of 1.1 cm., and the largest dimension of the undeployed mesh (20) is one centimeter, then the preferred thickness of the hydrogel (22) coating for this situation is 0.1 cm. FIG. 3 shows a nonspherical embodiment of treatment mesh (20) of the current invention, also having hydrogel coating (22), and further including radial stiff bars (40) in vertical orientation. In the preferred embodiment, all elements including bars (40) and wire (12) are coated with hydrogel (22).

Figure 4:
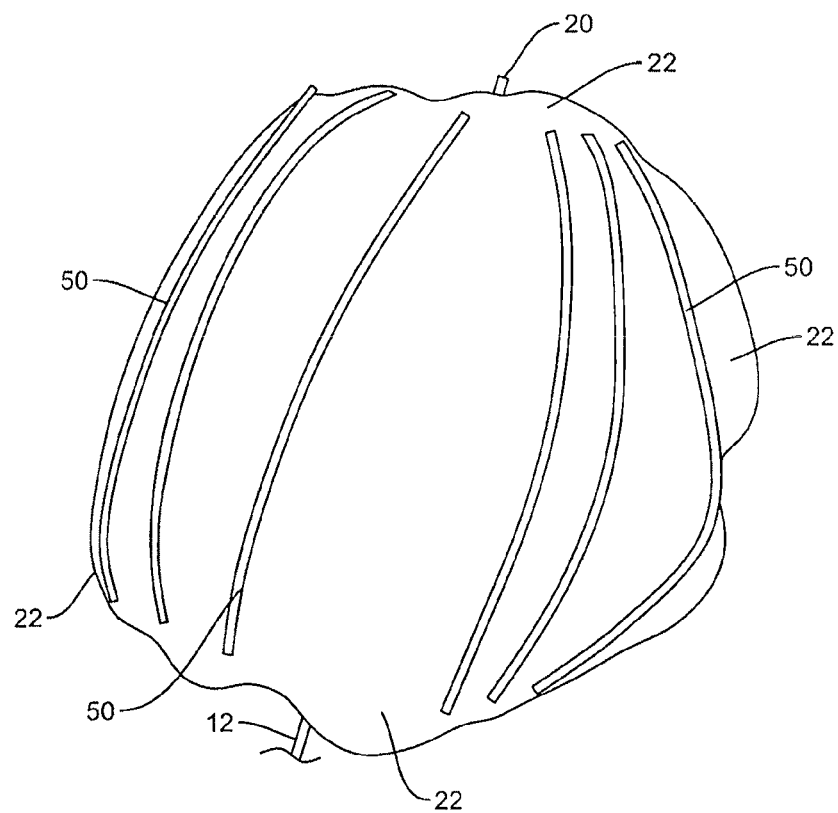
FIG. 4 showing at distal end of wire (12) deployed device designed to implement an endovascular treatment mesh (20) with hydrogel coating (22), further including vertically oriented elements (50) of reinforced mesh.

FIG. 4 also shows the nonspherical embodiment of treatment mesh (20) of the current invention, having hydrogel coating (22), and further including vertically oriented reinforcement members (50). In the preferred embodiment, all elements including reinforcement member (50) and wire (12) are coated with hydrogel (22).

Figure 5:
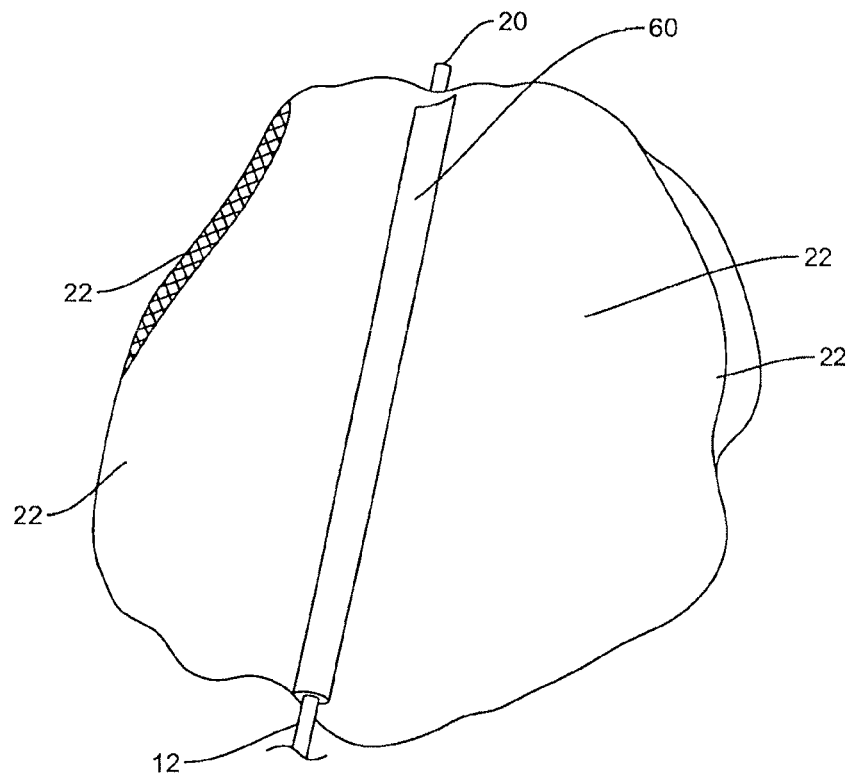
FIG. 5 showing at distal end of wire (12) deployed device designed to implement an endovascular treatment mesh (20) with hydrogel coating (22), further including a simple center-support bar or stick (60).

FIG. 5 shows the nonspherical embodiment of endovascular treatment mesh (20) having a hydrogel coating (22), and further including a simple center-support bar or stick (60). In the preferred embodiment, all elements including center-support bar or stick (60) and wire (12) are coated with hydrogel (22).

Figure 6A:
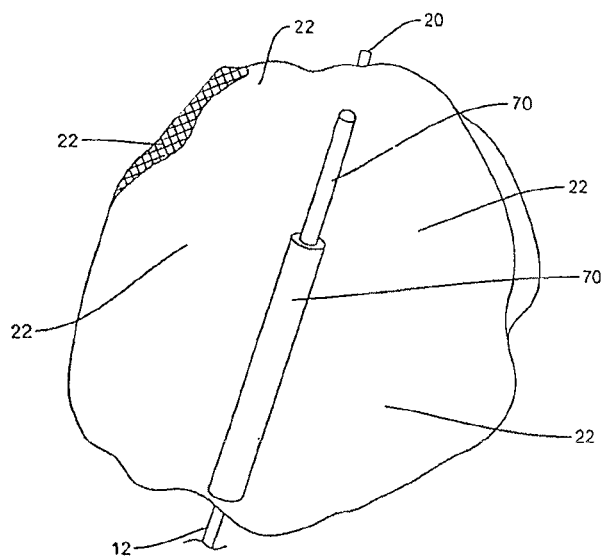
FIGS. 6A and 6B showing at distal end of wire (12) deployed device designed to implement an endovascular treatment mesh (20) with hydrogel coating (22), further including a telescoping center-support bar (70).
Figure 6B:
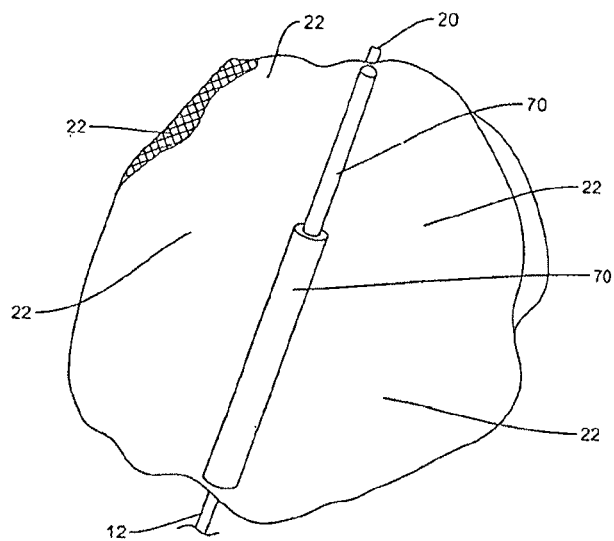

FIGS. 6A and 6B show the nonspherical embodiment of treatment mesh (20) of the current invention, also having hydrogel coating (22), and further including a telescoping center-support bar or stick (60). In the preferred embodiment, all elements including telescoping center-support bar (70) and wire (12) are coated with hydrogel (22).

Figure 7:
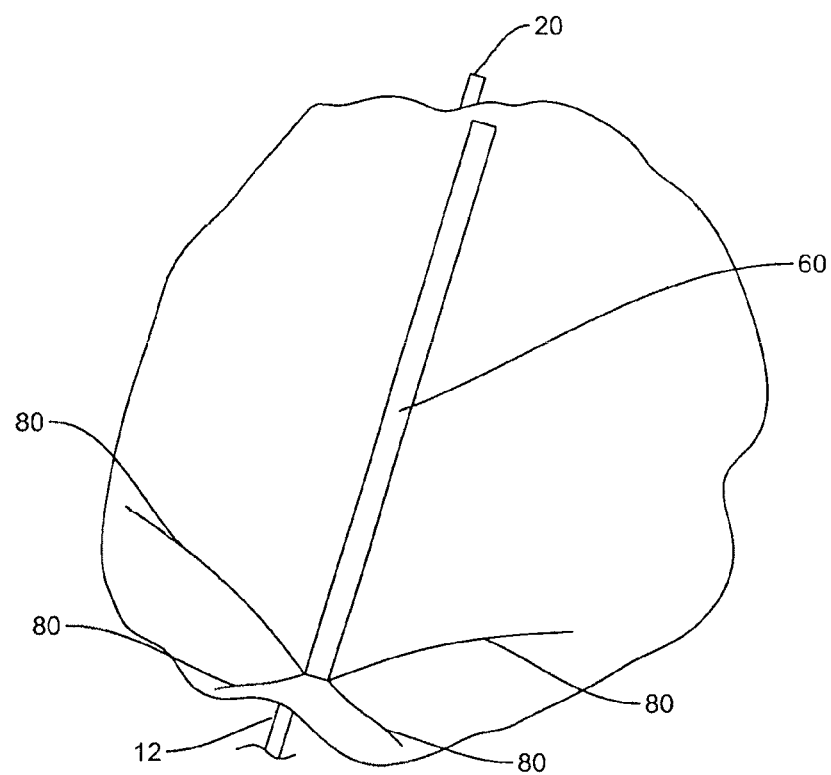
FIG. 7 showing at distal end of wire (12) deployed device designed to implement an endovascular treatment mesh (20) with hydrogel coating (22), further including a bar (60) with umbrella-like radial support struts (80).

FIG. 7 shows the nonspherical embodiment of treatment mesh (20) of the current invention, also having hydrogel coating (22), and further including umbrella-like radial support struts (80). In the preferred embodiment, all elements including umbrella-like radial support struts (80) and wire (12) are coated with hydrogel (22).

Figure 8:
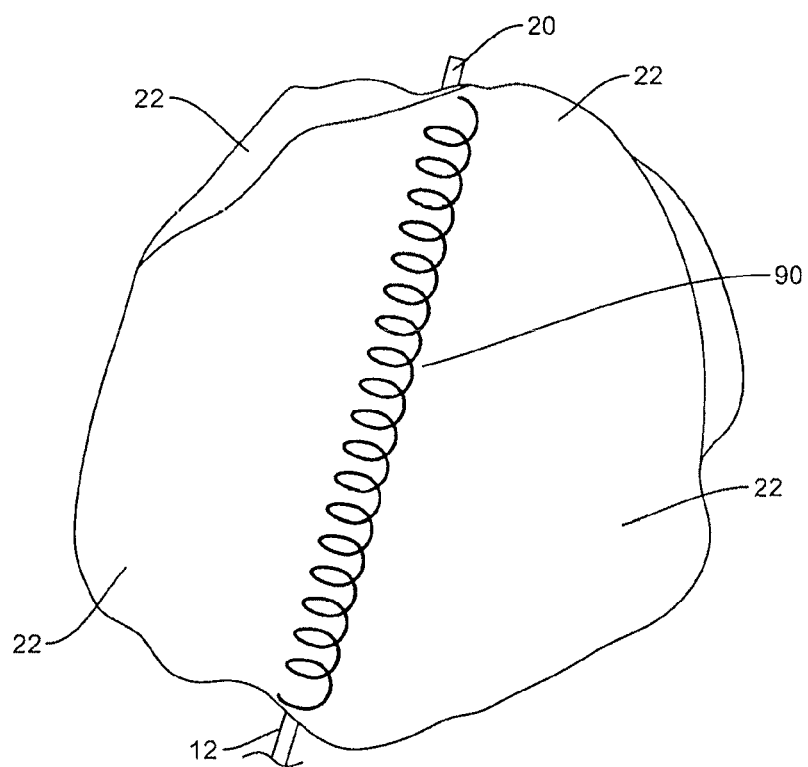
FIG. 8 showing at distal end of wire (12) deployed device designed to implement an endovascular treatment mesh (20) with hydrogel coating (22), further including a spring (90) of preset coil length that straightens in delivery-sheath catheter.

FIG. 8 shows the nonspherical embodiment of treatment mesh (20) of the current invention, also having hydrogel coating (22), and further including further including a spring (90) of preset coil length that straightens in delivery-sheath catheter. In the preferred embodiment, all elements including spring (90) and wire (12) are coated with hydrogel (22).

Figure 9:
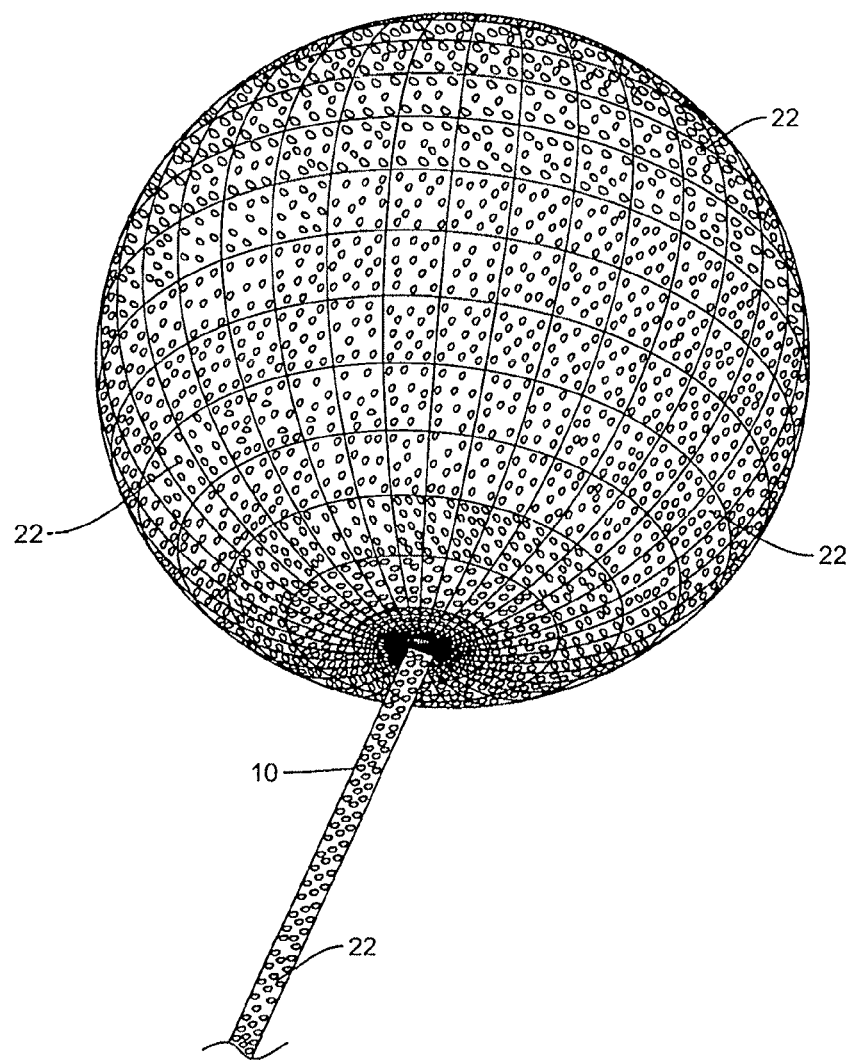
FIG. 9 shows the elements of FIG. 1 wherein the entire structure is coated with hydrogel (22).

FIG. 9 shows the elements of FIG. 1 wherein the entire structure is coated with hydrogel (22).

In the foregoing embodiments, wire (12) may be included with or substituted by another endovascular delivery device (not shown) which, in the preferred embodiments, are also coated with hydrogel (22) in a thickness adapted to the size of the vasculature.

The present invention may be used according to the following method. To use the present invention to ameliorate aneurysm recurrences, amorphous hydrogel is deployed upon an intrasaccular occlusion device as follows:

(a) providing an insertion rod having a first end and a second end, and
(b) said intrasaccular occlusion tool connected to the first end of the insertion rod,
(c) said intrasaccular occlusion tool having an outer surface and an inner surface,
(d) said outer surface coated with said amorphous hydrogel, and (e) said intrasaccular occlusion tool being moveable between a retracted position and a deployed position;
(f) inserting said intrasaccular occlusion tool and a portion of the insertion rod into the brain using arterial pathways while said intrasaccular occlusion tool is in a retracted position;
(g) deploying said intrasaccular occlusion tool inside an aneurism such that said intrasaccular occlusion tool is configured to provide a seal between said aneurism and said arterial pathway; and
(h) securing the perimeter of said outer surface of said intrasaccular occlusion tool against a wall of said aneurism.

The present invention can alternatively be used by embedding or impregnating pharmaceutical compounds medications in a stent for local delivery, short release or sustained release using permanent nondegradable hydrogel or biodegradable hydrogel. The following are nonlimiting embodiments.

Placing a stent with chemotherapy embedded into carotid artery for a brain tumor in that vascular distribution, or in Right renal artery for a right kidney tumor, or in right pulmonary artery for a right lung mass. This could allow sustained delivery locally, while minimizing the systemic dose and associated side effects.

Embodiments of the present invention are configured for use in genitourinary tract, biliary tract, and gastrointestinal tract procedures, by adapting the size of the treatment mesh, wherein said size is configured to fill outpouchings in the appropriate tract. While keeping the mesh screen size and hydrogel density the same, the overall size of the device is conformed to fill outpouchings in the appropriate tract.

Embodiments of the present invention are configured for use in the intravascular tract (zone).

Similarly, to minimize the risk of severe symptomatic vasospasm in aneurysmal subarchnoid hemorrhage (a typical bleed from a ruptured brain aneurysm), a vasodilator that slowly releases over time can be embedded in a stent for placement in the common or internal carotid arteries on both sides, +1− placement in one or both vertebral arteries. Nonlimiting examples of vasodilators that can be embedded include nimodipine, verapamil, Cardene, nitroglycerin, and nitroprusside. Although the invention has been described in detail in the foregoing embodiments and methods for the purpose of illustration, it is to be understood that such detail is solely for that purpose, and that variations can be made therein by those skilled in the art without departing from the spirit and scope of the invention, except as it may be described by the following claims.

I claim:

1. A treatment device, which comprises:
an expandable member configured to at least partially occupy an outpouching in an organ and defining an interior, and being deployable within the outpouching with a delivery member; and
a reinforcing extension member mounted with respect to the expandable member to at least partially support the expandable member when deployed in the outpouching, the reinforcement extension member comprising a telescopic support including at least two telescopic elements configured for relative movement to control a length of the telescopic support, the at least two telescoping elements entirely confined within the interior of the expandable member upon deployment within the outpouching and released by the delivery member.

2. The treatment device according to claim 1 wherein the expandable member comprises a mesh device.

3. The treatment device according to claim 2 including a hydrogel coating disposed on one of an inner surface and an outer surface of the mesh device.

4. The treatment device according to claim 3 wherein the hydrogel coating is configured to expand in vivo.

5. The treatment device according to claim 3 wherein the hydrogel coating is one of biodegradable and non-biodegradable.

6. The treatment device according to claim 3 wherein the hydrogel coating is impregnated with at least one pharmaceutical compound.

7. The treatment device according to claim 6 wherein the at least one pharmaceutical compound is configured for controlled release in the organ.

8. The treatment device according to claim 2 wherein the mesh device is configured to at least partially occupy a vascular aneurysm.

9. The treatment device according to claim 2 wherein the mesh device is configured for at least one of intravascular use, the genitourinary tract, the biliary tract and the gastrointestinal tract.

10. The treatment device according to claim 1 wherein the telescopic support is preset to a minimum height.

11. The treatment device according to claim 1 including a delivery member to deliver the expandable member relative to the outpouching in the organ, the reinforcement extension member free from connection to the delivery member.

12. A treatment device which comprises:
an expandable member configured to at least partially occupy an outpouching in an organ and defining an interior;
a reinforcing extension member mounted with respect to the expandable member to at least partially support the expandable member when deployed in the outpouching, the reinforcement extension member comprising a telescopic support including at least two telescopic elements configured for relative movement to control a length of the telescopic support, the at least two telescoping elements entirely confined within the interior of the expandable member; and
a hydrogel coating disposed on at least one of the at least two telescopic elements of the telescopic support.

13. A treatment device, which comprises:
an expandable member configured for insertion in a vascular organ with a delivery member, the expandable member configured to expand to an at least partially expanded condition in association within insertion in a target site within the vascular organ; and
a telescopic support at least partially disposed in the expandable member and independent of the delivery member, the telescopic support configured to maintain the expandable member in the at least partially expanded condition, the telescopic support including first and second elements configured for relative movement to selectively control a length of the telescopic support with the expandable member, the telescopic support entirely confined within the interior of the expandable member when the expandable member is inserted in the target site and released from the delivery member.

14. The treatment device according to claim 13 including a hydrogel applied to the expandable member, the hydrogel expandable in vivo to assist in retention of the expandable member at the target site.

15. The treatment device according to claim 14 wherein the hydrogel coating is impregnated with at least one pharmaceutical compound.

16. The treatment device according to claim 13 wherein the expandable member is configured to at least partially occupy an aneurysm within the vascular organ.

17. The treatment device according to claim 13 wherein the expandable member comprises a stent configured for insertion at the target site within the vascular organ.

18. A treatment device, which comprises:
an expandable member configured for insertion in a vascular organ with a delivery member, the expandable member configured to expand to an at least partially expanded condition in association within insertion in a target site within the vascular organ; and
an extendable support at least partially disposed in the expandable member and independent of the delivery member, the extendable support configured to maintain the expandable member in the at least partially expanded condition, the first and second members of the extendable support entirely confined within an interior of the expandable member when the expandable member is inserted in the target site and released from the delivery member.

19. The treatment device according to claim 18 wherein the extendable support includes first and second members coupled to each other and configured for relative movement within the expandable member to adjust to a dimension of the expandable member.

\* \* \* \* \*